United States Patent [19]

Gleckman

[11] Patent Number: 5,285,318
[45] Date of Patent: Feb. 8, 1994

[54] ILLUMINATION SYSTEM HAVING AN ASPHERICAL LENS

[75] Inventor: Philip Gleckman, Oak Park, Ill.

[73] Assignee: NiOptics Corporation, Evanston, Ill.

[21] Appl. No.: 901,896

[22] Filed: Jun. 22, 1992

[51] Int. Cl.$^5$ .............................................. G02B 3/02
[52] U.S. Cl. .................................. 359/709; 359/708; 359/869
[58] Field of Search .................... 359/708, 709, 869

[56] References Cited

U.S. PATENT DOCUMENTS

4,114,592  9/1978  Winston .
5,001,609  3/1991  Gardner et al. .................... 362/346
5,005,958  4/1991  Winston et al. .................... 359/727

Primary Examiner—Bruce Y. Arnold
Attorney, Agent, or Firm—Reinhart, Boerner, VanDeuren, Norris & Rieselbach

[57] ABSTRACT

A lens system containing an aspherical portion enabling minimization of spherical aberration as well as the lens length. The lens system includes a conical lens portion providing total internal reflection of light within the lens system and an integrally attached aspherical lens portion. For light rays within a defined angular range of less than about ±24°, the light rays are focused on the exit aperture (for a concentrator) at a minimum lens length, 1.1.

15 Claims, 2 Drawing Sheets

ILLUMINATION SYSTEM HAVING AN ASPHERICAL LENS

The invention is generally concerned with an illumination system using an aspherical lens in at least part of the system. More particularly, the invention is concerned with a lens system having an aspherical containing lens portion integrally coupled to a conical lens portion to provide a lens system of minimum overall length and substantially diminished aberration effects.

A number of optical applications require the use of a lens system employing a light source at a finite distance from the lens system for producing a desired illumination output or a target at a finite distance from the lens to collect light (reverse problem). Frequently, such systems utilize spherical lens components which lead to spherical aberration; and the lens system itself can have a relatively large operating length making practical applications difficult to implement, or even impossible to carry out under conditions allowing only limited operational space.

OBJECTS OF THE INVENTION

It is therefore an object of the invention to provide an improved illumination system and method of designing an illumination system.

It is another object of the invention to provide a novel lens system having minimum length while producing the desired optical illumination or concentration with minimal aberration effects.

It is a further object of the invention to provide an improved lens system having an aspherical lens portion and a conical lens portion of minimum length while producing a desired optical illumination.

It is yet an additional object of the invention to provide an improved illumination system having an aspherical lens portion causing incident light rays to by imaged on the exit aperture using a minimum conical lens portion length.

It is still another object of the invention to provide a novel aspherically based lens system having minimized spherical aberration.

It is yet a further object of the invention to provide an improved illumination system and method of manipulating light such that light rays within a controlled angular range are controllably deflected to pass through the exit aperture at a minimum overall lens length.

It is still another object of the invention to provide a novel light concentrator lens system having a minimum conical lens portion length and minimized aberration effects.

Other objects and advantages of the lens system, together with the manner of operation thereof will become apparent from the following detailed description and drawings described below, wherein like elements have like numerals throughout the several drawings.

DETAILED DESCRIPTION OF PREFERRED EMBODIMENTS

Figure 1A:
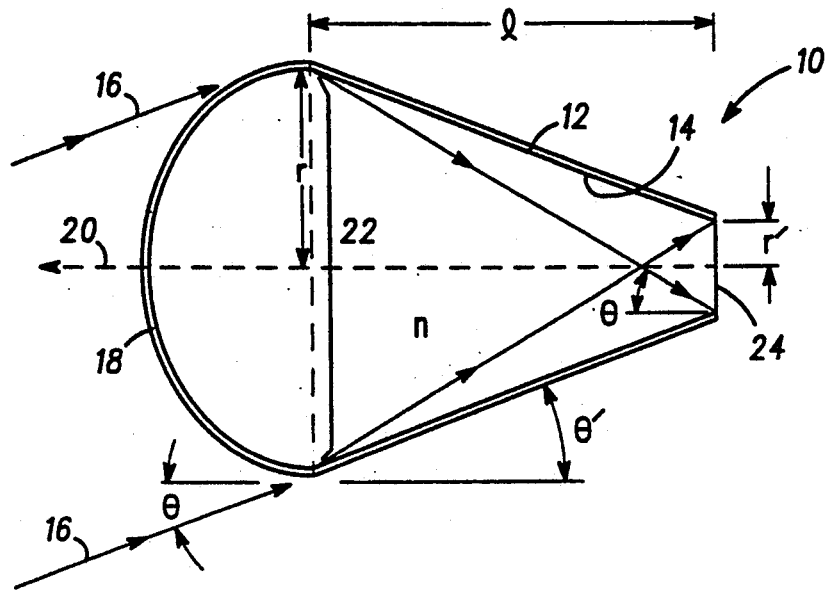
FIG. 1A illustrates a lens system constructed in accordance with the invention.

A lens system constructed in accordance with the invention is shown generally at 10 in the figures. In particular, in FIG. 1A is shown the lens system 10 comprising a conical lens portion 12 which typically has a reflective layer (such as, a solid/air boundary) 14 for providing total internal light reflection for light which has entered the lens system 10. For purposes of illustrating the features of the invention, light rays 16 are shown entering an aspherical containing lens Portion 18 (hereinafter, "aspherical portion 18") with the lens system operated as a concentrator lens. The features of the invention, including the method of operation as a collimator lens system 10, are also made apparent by the description provided herein.

In the lens system 10 the conical lens portion 12 has an associated index of refraction, "n". The lens portion 12 is a total internal reflection cone, or can also be a metallic reflecting cone, which is integrally coupled to the aspherical portion 18. The lens system 10 has a central longitudinal optical axis 20. The conical lens portion 12 has an entrance aperture 22 of radius, r, and an exit aperture 24 of radius r'. The aspherical portion 18 has a surface shape causing the light rays 16 incident thereon at an angle $\theta$ (less than about $\pm 24°$) to the central longitudinal optical axis 20 to be imaged after reflection on the exit aperture 24 at a minimum distance, l (length of the conical lens portion 12), in accordance with the expression:

$$l = (r+r')/(\tan \theta') \quad (1)$$

$$r \sin\theta = (r' \sin \theta'')(n)$$
$$\theta'' = \text{output angle in medium}$$

$$\theta' = \pi/2 - \theta - \sin^{-1}\frac{(\cos 2\theta)}{n} \quad (2)$$

n = index of refraction described above

Figure 1B:
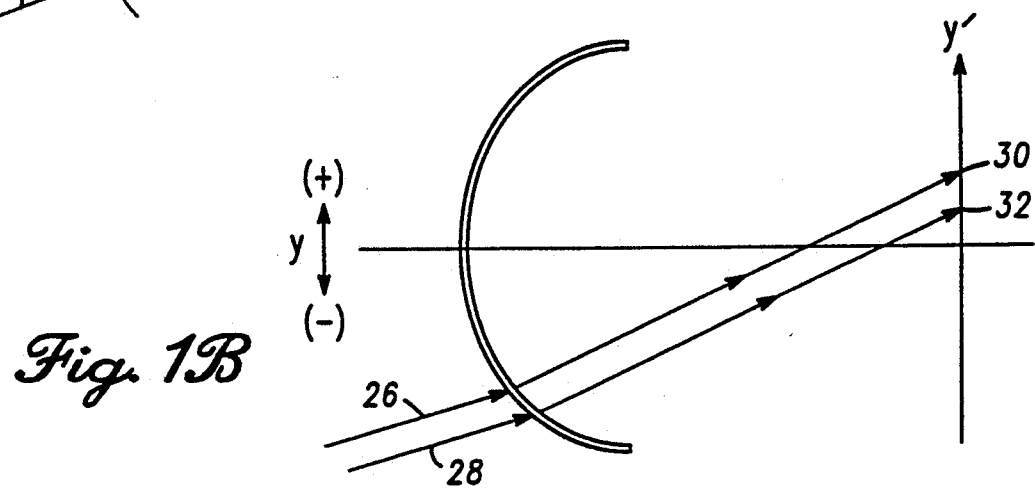
FIG. 1B shows two closely adjacent light rays propagating through the lens system and FIG. 1C illustrates the relative slope of the intercept points at an aperture for the light rays of FIG. 1B.
Figure 1C:
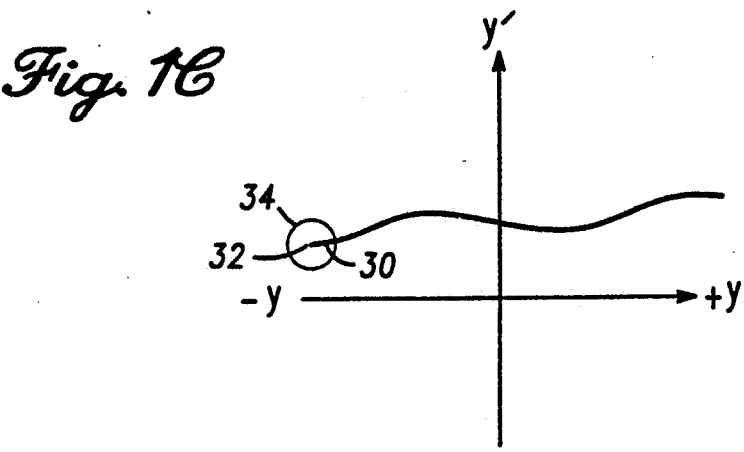

In addition to the lens system 10 meeting the conditions of these equations, adjacent edge rays 26 and 28 (see FIG. 1B) must define ray intercepts 30 and 32, respectively, at the exit aperture 24 such that the derivative of the ray intercepts 30 and 32 is a positive value (see FIG. 1C at the circled region 34 indicating the particular intercepts and the positive slope of the intercept plot).

Within the angle $\theta \leq \pm 24°$, the aspherical portion 18 provides satisfactory imaging performance. For larger angles, an increasing degree of aberration limits the performance.

Figure 2:
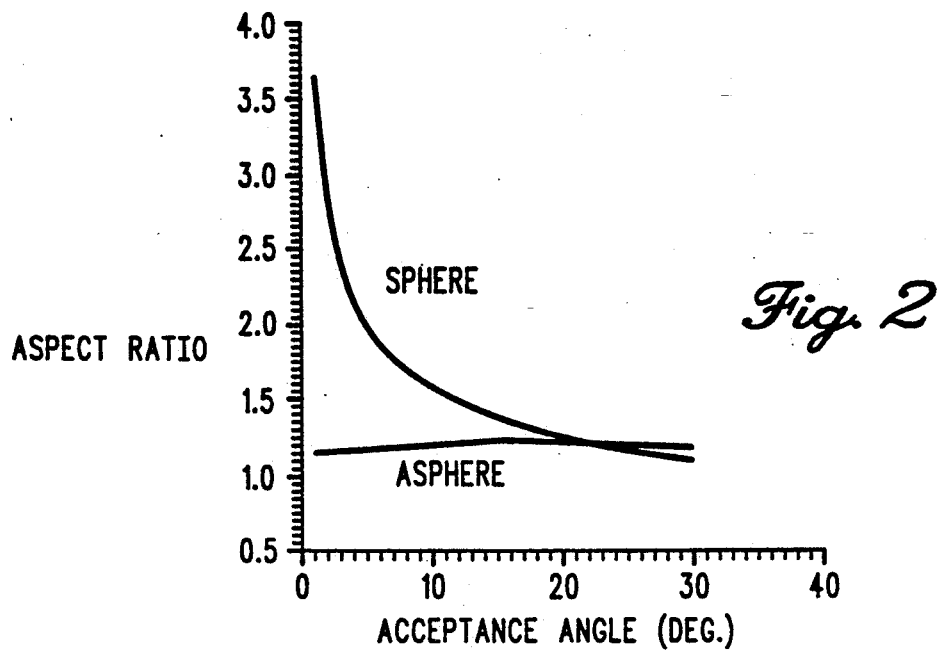
FIG. 2 illustrates the variation of the aspect ratio with acceptance angle for spherical and aspherical lens systems.
Figure 3A:
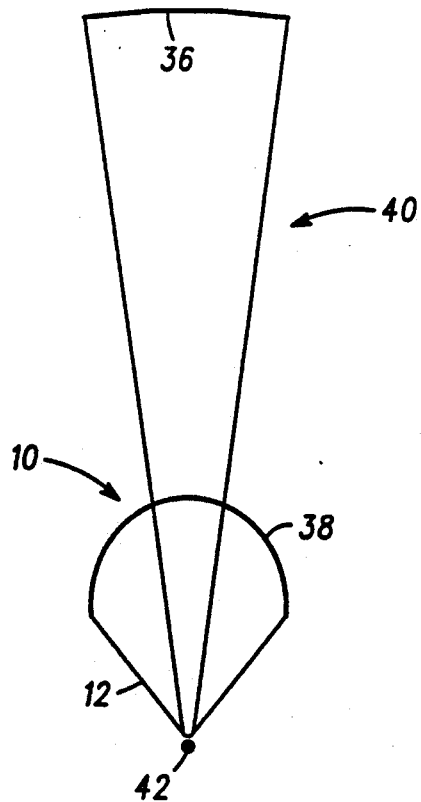
FIG. 3A shows comparative examples of a spherical and an aspherical lens system with the same input angle, output angle and index of refraction but having different lengths.
Figure 3B:
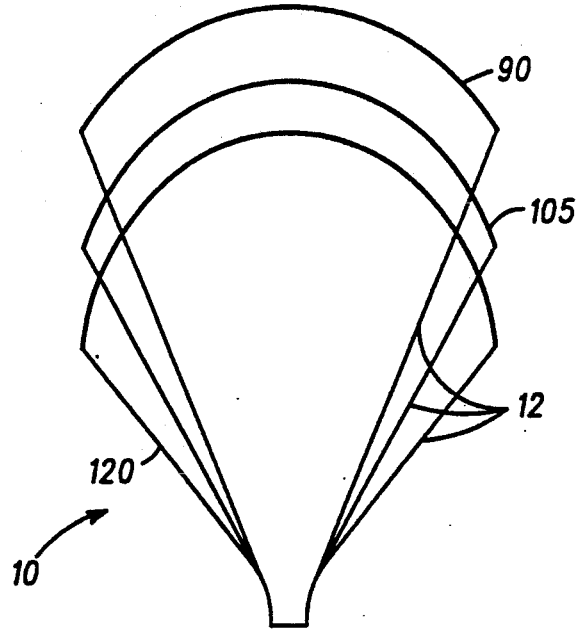
FIG. 3B illustrates three aspherical lens systems having different aspect ratios.

As further shown in FIG. 2, for acceptance angles less then about 24° a spherical lens element 36 results in a substantially increasing aspect ratio value (overall lens length to largest width of the lens portion 18). By way of comparison, FIG. 3A shows a pure spherical lens element 36 and a pure aspherical portion 38; and the resulting length, l, is much larger for spherical system 40. In an illumination output from a light source 42, with an output angle of one degree, an input angle of forty-two degrees and an index of refraction n=1.5, the best spherical lens element 36 has an associated lens surface angle of 23° while the best aspherical portion 38 describes an angle of 42°. In FIG. 3B are shown various aspherical examples with different angular spread for the aspherical lens portion 18.

The aspherical portion 18 shown in FIG. 1 in a most preferred embodiment can include at least one of an ellipsoidal, a parabolic and a hyperbolic surface. In the case of the aspherical portion 18 being an ellipsoid of eccentricity equal to the inverse of the index of refraction (1/n), the light rays 16 with $\theta=0$ are focused at the focal plane near the aperture 24 with the path lengths being the same for all rays. This feature gives the user the ability to form off axis images without spherical aberration and having a very short conical lens portion 18 with length, l. This lens system allows one to use the light source 42 in an output mode and generate a beam of light over an angular range of about $<\pm 24°$.

In designing the lens system 10, two different approaches can be used. In the first approach, one reduces the spherical aberration by selecting appropriate lens elements (ellipsoidal, e.g.). The lens system 10 also should satisfy the requirements of minimizing the length of the conical lens portion 18 in accordance with Expression (1) provided hereinbefore. The next step involves checking the selected lens elements to be certain the lens system has negative coma, that is, adjacent light rays at one extreme of an input aperture define a positive value ray intercept at the exit aperture (described hereinbefore).

In the second design method, one can obtain a lens design which will achieve perfect imaging conditions for the light rays at the extreme field angle $\theta$ (typically less than about $\pm 24°$). This solution is then rotated about the central longitudinal optical axis 20 to obtain the full solution.

While preferred embodiments of the invention have been shown and described, it will be clear to those of skill in the art that changes and modifications can be made without departing from the invention in its broader aspects.

What is claimed is:

1. A lens system, comprising:
a conical lens portion providing internal reflection of light rays present therein; and
an aspherical containing lens portion integrally coupled to said conical lens portion and said lens portions having a central longitudinal optical axis and said conical lens portion having an entrance and exit aperture with radii r and r', respectively, and said aspherical lens portion further having a surface shape causing light rays incident thereon with an angle of incidence $\theta$ less than about 24° to the central longitudinal optical axis to be imaged after reflection from said conical lens portion on said exit aperture at a minimum distance l in accordance with the expression, $$l = (r+r')/(\tan \theta') \quad (1)$$

$r \sin\theta = (r' \sin \theta'')(n)$
$\theta''$ = output angle in medium $$\theta' = \pi/2 - \theta - \sin^{-1}\frac{(\cos 2\theta)}{n} \quad (2)$$

n = index of refraction described above
and edge rays defining ray intercepts at said exit aperture plane such that the derivative of said ray intercept is a positive value.

2. The lens system as defined in claim 1 wherein said aspherical containing lens portion includes at least one of ellipsoidal, parabolic and hyperbolic surfaces.

3. The lens system as defined in claim 1 wherein said aspherical lens portion has no spherical elements thereby providing spherical aberration free imaging.

4. The lens system as defined in claim I wherein said aspherical lens portion comprises on ellipsoid of eccentricity equal to the inverse of the index of refraction.

5. A lens system having a minimum length, comprising:
a conical lens portion providing internal reflection or metallic reflection of light rays present therein; and
an aspherical lens portion integrally coupled to said conical lens portion and said lens portions having a central longitudinal optical axis and said conical lens portion having a characteristic index n and an entrance and exit aperture with radii r and r', respectively, and said minimum length determined as a function of the angle $\theta$ of light rays relative to the central longitudinal axis and said index n with said aspherical lens portion further having a surface shape causing light rays off-axis from said central optical axis and at each extreme of said aspherical lens portion to pass through s id exit aperture with the light ray incident at a glancing angle at one extreme edge defining an angle $\theta'$ relative to said central optical axis inside said conical lens portion and said minimum length defined as a function of tan $\theta'$.

6. The lens system as defined in claim 5 wherein the angle of acceptance $\theta$ for providing spherical aberration free performance in less than about $\pm 24°$ off said central longitudinal optical axis.

7. The lens system as defined in claim 5 wherein said surface shape of said aspherical lens portion comprises an ellipsoidal shape.

8. The lens system as defined in claim 5 wherein said system comprises a light concentrator.

9. The lens system as defined in claim 5 further including a light source disposed at the distal end of said conical lens portion, said lens system operable to provide spherical aberration free illumination.

10. The lens system as defined in claim 5 further including a light source disposed at a large distance relative to the length of said lens system on the aspherical lens portion side of said lens system, said lens system operable to provide a concentrated image of said light source free of spherical aberration.

11. A method of manufacturing a lens system wherein light rays are optically manipulated using a minimum length lens system, comprising the steps of:
(a) forming a conical lens portion providing reflection of light rays present therein; and
(b) constructing an aspherical lens portion having a surface shape causing light rays off-axis from a central longitudinal optical axis to trace extreme edge rays with a first extreme edge ray tangent to one end of said aspherical lens portion and tracing a path forming an angle $\theta$ to said central optical axis with said minimum length l of said conical lens portion defined by the expression, $$l = (r+r')/(\tan \theta') \tag{1}$$

$$r \sin \theta = (r' \sin \theta'')(n)$$
$$\theta'' = \text{output angle in medium}$$

$$\theta' = \pi/2 - \theta - \sin^{-1}\frac{(\cos 2\theta)}{n} \tag{2}$$

n = index of refraction described above

12. A method of spherical aberration free manipulation by a user of light rays incident on a lens system off-axis from a central optical longitudinal axis, comprising the steps of:
(a) providing a lens system comprising:
(i) a solid conical lens portion providing total internal reflection of light rays present therein; and
(ii) a solid aspherical lens portion integrally coupled to said solid conical lens portion and said lens portion having a central longitudinal optical axis with said solid aspherical lens portion further having a surface shape causing light rays off-axis from said central optical axis to trace extreme rays with a first extreme edge ray tangent to one end of said aspherical lens portion and tracing a path forming an angle $\theta$ to said central optical axis with said minimum length l of said conical lens portion defined by the expression, $$l = (r+r')/(\tan \theta') \tag{1}$$

$$r \sin \theta = (r' \sin \theta'')(n)$$
$$\theta'' = \text{output angle in medium}$$

$$\theta' = \pi/2 - \theta - \sin^{-1}\frac{(\cos 2\theta)}{n} \tag{2}$$

n = index of refraction described above
(b) interposing said lens system at a selected location relative to a light source, said selected location causing the light from said light source to be incident at an acceptance angle off axis from said central optical longitudinal axis; and
(c) applying the light without spherical aberration in the user desired manner.

13. The method as defined in claim 12 wherein said acceptance angle is less than about ±24° and having an absolute value greater than 0° relative to said central optical longitudinal axis.

14. The method as defined in claim 12 wherein the light source is disposed a large distance from said lens system and the light is concentrated by said lens system forming a spherical aberration free image.

15. The method as defined in claim 12 wherein the light source is disposed adjacent the distal end of said conical lens portion and the light is output from said surface of said aspherical lens portion providing aberration free illumination.

* * * * *